United States Patent [19]

Moriyama et al.

[11] Patent Number: 4,989,130
[45] Date of Patent: Jan. 29, 1991

[54] SYSTEM FOR DETERMINING AND STORING VALID STATUS INFORMATION RECEIVED FROM CROSS COUPLED UNIT

[75] Inventors: Junichi Moriyama; Masaaki Iwasaki, both of Kawasaki, Japan

[73] Assignee: Fujitsu Limited, Kawasaki, Japan

[21] Appl. No.: 280,884

[22] Filed: Dec. 7, 1988

[30] Foreign Application Priority Data

Dec. 7, 1987 [JP] Japan ................. 62-307637

[51] Int. Cl.⁵ ............................................ G06F 11/16
[52] U.S. Cl. ........................... 364/200; 364/264.1; 364/268.4; 364/268.9; 371/8.1
[58] Field of Search ... 364/200 MS File, 900 MS File, 364/187, 184; 371/36, 67.1, 68.1, 68.3, 8.1, 9.1

[56] References Cited

U.S. PATENT DOCUMENTS

| | | | |
|---|---|---|---|
| 3,864,670 | 2/1975 | Inoue et al. | 364/200 |
| 3,889,237 | 6/1975 | Alferness et al. | 364/200 |
| 4,044,337 | 8/1977 | Hicks et al. | 364/200 |
| 4,413,327 | 11/1983 | Sabo et al. | 364/900 |
| 4,455,601 | 6/1984 | Griscom et al. | 364/200 |
| 4,488,223 | 12/1984 | Chiwaki | 364/200 |
| 4,558,415 | 10/1985 | Zuber et al. | 364/187 |
| 4,590,549 | 5/1986 | Burrage et al. | 365/184 |
| 4,774,709 | 9/1988 | Tulpule et al. | 371/36 X |

FOREIGN PATENT DOCUMENTS 55-59526 5/1980 Japan.
57-150058 9/1982 Japan.
60-165191 8/1985 Japan.

Primary Examiner—Thomas C. Lee
Attorney, Agent, or Firm—Staas & Halsey

[57] ABSTRACT

An initial status setting system in a multi-unit system constructed of a plurality of units wherein at least a set of status data is held in registers in at least two of the plurality of units, both units indicating whether or not the set of status data held in each of the registers is valid. The output of each of the registers is applied to the other of the registers, and each of the registers is controlled so that only a valid set of status data is input thereto.

6 Claims, 10 Drawing Sheets

SYSTEM FOR DETERMINING AND STORING VALID STATUS INFORMATION RECEIVED FROM CROSS COUPLED UNIT

BACKGROUND OF THE INVENTION

(1) Field of the Invention

The present invention relates to an initial status setting system; more particularly, it relates to an initial status setting system in a multi-unit system having a plurality of units each of which can be replaced independently.

(2) Description of the Related Art

In some multi-unit systems having a plurality of units, each of the plurality of units can be replaced independently. For example, when a malfunction occurs in one unit of the plurality of units, the unit at which the malfunction has occurred can be manually replaced by a normal unit.

In the above type of multi-unit system, each of the plurality of units holds its own respective status information and operates in accordance with that status information.

Further, in the above type of multi-unit system, the status information for each unit is also held by another unit within the multi-unit system.

A multiplexing equipment shown in FIG. 1 is an example of the multi-unit system as mentioned above. The multiplexing equipment shown in FIG. 1 is constructed with a plurality of multiplexing units $1_1 \sim 1_N$ and a control unit $1_0$. Each of the multiplexing units $1_1 \sim 1_N$ functions as a trunk group multiplexer which combines data from a plurality of digital trunk groups (each having a low data signaling rate for example, 1.5M b ps) by time-division-multiplexing to obtain a digital trunk group having a higher data signaling rate in the bit stream for transmission (for example, 45M b ps).

Each of the multiplexing units $1_1 \sim 1_N$ holds a set of status data showing its own status, for example, in an EEPROM $2_1 \sim 2_N$, respectively, and operates in accordance with that status data. The sets of status data for all the multiplexing units $1_1 \sim 1_N$ are also held in the control unit $1_0$, for example, in an EEPROM $2_0$.

Concretely, the status data comprises a priority status, an error rate status, a loop back status, a input inhibit status, information showing whether or not the multiplexing unit is in operation, and information showing whether or not the multiplexing unit is in an alarm state.

The priority status shows a priority order for replacement by one of the stand-by unit when malfunctions occur with regard to a plurality of the operating multiplexing units. Usually one unit among the multiplexing units $1_1 \sim 1_N$ is reserved as a stand-by unit, to be used as a replacement for an operating multiplexing unit in which a malfunction occurs during operation.

The error rate status determines an allowable rate of errors detected in the multiplexing unit, and when the detected error rate is higher than the allowable rate, an alarm warning an operator of a high error rate is output. The allowable rate is determined by the error rate status, for example, $10^{-3}$ or $10^{-4}$.

The loop back status shows whether or not a loop back is carried out in the multiplexing unit.

The input inhibit status identifies an input signal or input signals to be inhibited.

Generally, the status data such as the priority status, the error rate status, the loop back status, and the input inhibit status for each of the multiplexing units $1_1 \sim 1_N$ is set by a command from a console unit (not shown) supplied to the control unit $1_0$, and from the control unit $1_0$ to each of the multiplexing units $1_1 \sim 1_N$.

As mentioned above, in a conventional multi-unit system, when a malfunction occurs in one multiplexing unit of a plurality of multiplexing units $1_1 \sim 1_N$, the unit at which the malfunction occurs must be manually replaced by a normal unit.

After the replacement, as mentioned above, the same status data as held in the old unit, which was removed, must be also held in the new unit installed as a replacement for the old unit.

In the prior art, when a multiplexing unit is replaced, the status data held in the control unit $1_0$ is supplied as to the status data to be held in the replaced multiplexing unit after the new multiplexing unit is installed, since the status data for all of the multiplexing units $1_1 \sim 1_N$ is also held in the control unit $1_0$.

When the control unit $1_0$ is replaced, the status data for all of the multiplexing units $1_1 \sim 1_N$ must be set manually, because the status data in the EEPROM $2_0$ of the replacement control unit $1_0$ is generally different from the status data held in the removed control unit $1_0$.

Therefore, in the conventional multiplexing equipment constructed of a plurality of multiplexing units and a control unit, a troublesome operation is required to set the status data when the control unit is replaced, and this also means that there is a long delay before the opration of the multiplexing equipment can be restarted after the control unit is replaced, and a posibility arises that an error will occur when the status data is set manually.

The same problems as in the conventional multiplexing equipment mentioned above exist in the general multi-unit system having a plurality of units wherein each of which units can be replaced independently by a new unit, each of the units holding its own respective status information and the status information for each unit also being held by another unit within the multi-unit system.

In the multi-unit system as mentioned above, where status data is held in two units as in the abovementioned example, it is possible to construct a status data setting system wherein the status data held in a predetermined one of the two units is automatically supplied to the other of the two units, but the status data is not supplied in the opposite direction. In the above construction, when a unit other than the predetermined one of the two units is replaced, the status data held in the predetermined unit can be supplied and set automatically from the predetermined unit to the other of the two units after the replacement therof. However, when the predetermined unit of the two units is replaced, since the predetermined unit can only supply the other unit with certain status data, and is replaced, the status data held in the predetermined unit before the replacement must be set manually into the replacement unit.

Therefore, in the conventional multi-unit system as mentioned above, a troublesome operation must be performed to set the status data when a predetermined unit is replaced, and therefore, a long delay occurs before the opration of the multi-unit system can be restarted after the predetermined unit is replaced, and a posibility arises that an error will occur when the status data is set manually.

SUMMARY OF THE INVENTION

The object of the present invention is to provide an initial status setting system in a multi-unit system constituted of a plurality of units, and in which multi-unit system each of the units can be replaced independently by a new unit, each of the units holding its own status information, respectively, and wherein the status information for each unit is also held by another unit within the multi-unit system; the initial status setting system enables automatically setting of status data in all units constituting the multi-unit system after the replacement of a unit and after a power-ON operation.

According to the present invention, there is provided an initial status setting system in a multi-unit system constructed of a plurality of units wherein at least a set of status data is held in at least two of said plurality of units, namely, a first unit and a second unit. The system comprises a first status register, a first registered status validity indicating means, a first receiving status validity detecting means, and a first control means for said first unit. The system further comprises a second status register, a second registered status validity indicating means, a second receiving status validity detecting means, and a second control means for said second unit. Each of said first and second status registers holds said set of status data, and said set of status data held in each of said first and second status registers is sent to each of the other of said first and second units. Each of said registered status validity indicating means indicates whether or not the set of status data held in the corresponding one of said status registers is valid. The receiving status validity detecting means, corresponding to each of said first and second units, detects whether or not the indication of the registered status validity indicating means, corresponding to the other of said first and second units, indicates that the data is valid; and said control means, corresponding to one of said first and second units, enables the set of status data received from the other of said first and second units to be written into one of the status registers corresponding to said one of said first and second units only when the set of status data received from the other of said first and second units is detected as valid data.

DESCRIPTION OF THE PREFERRED EMBODIMENTS

Figure 1:
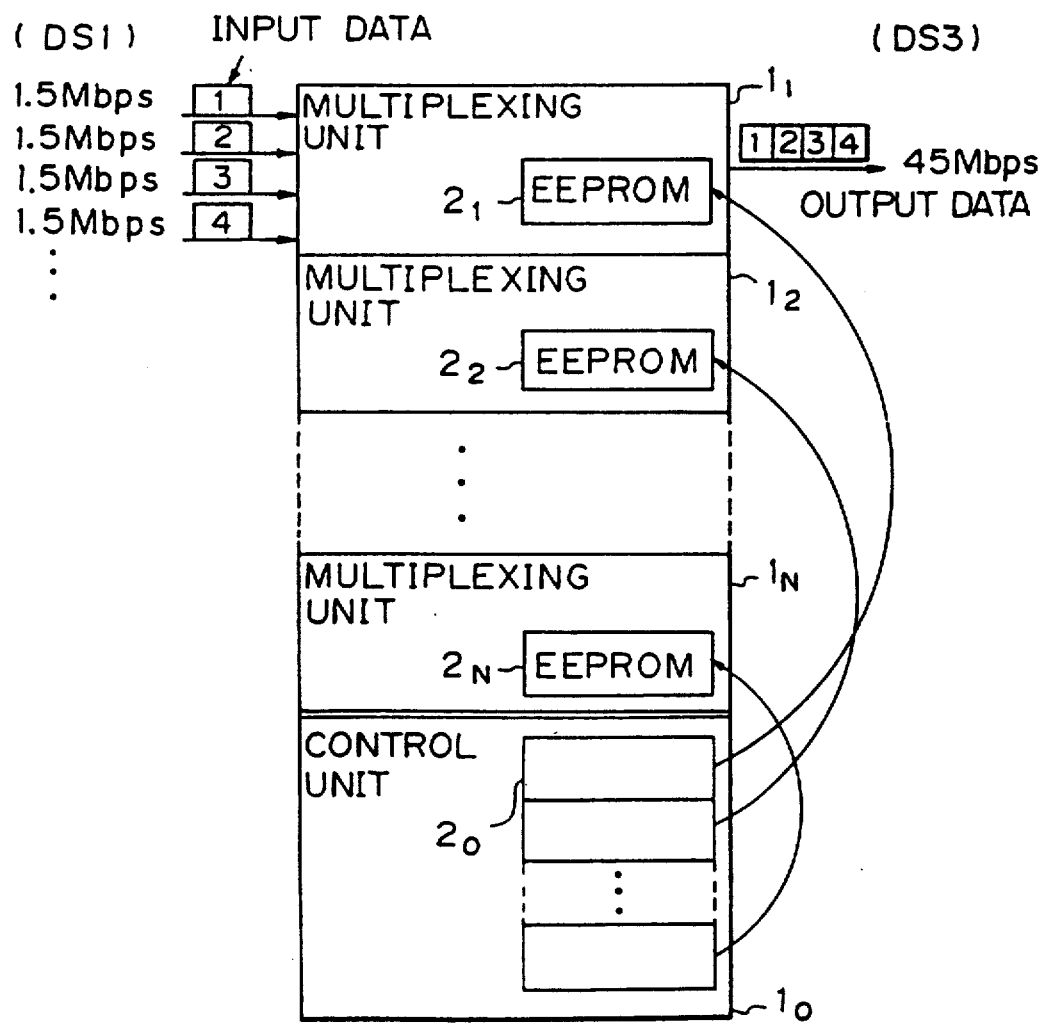
FIG. 1 shows an outline of the construction of the conventional multiplexing equipment.
Figure 2:
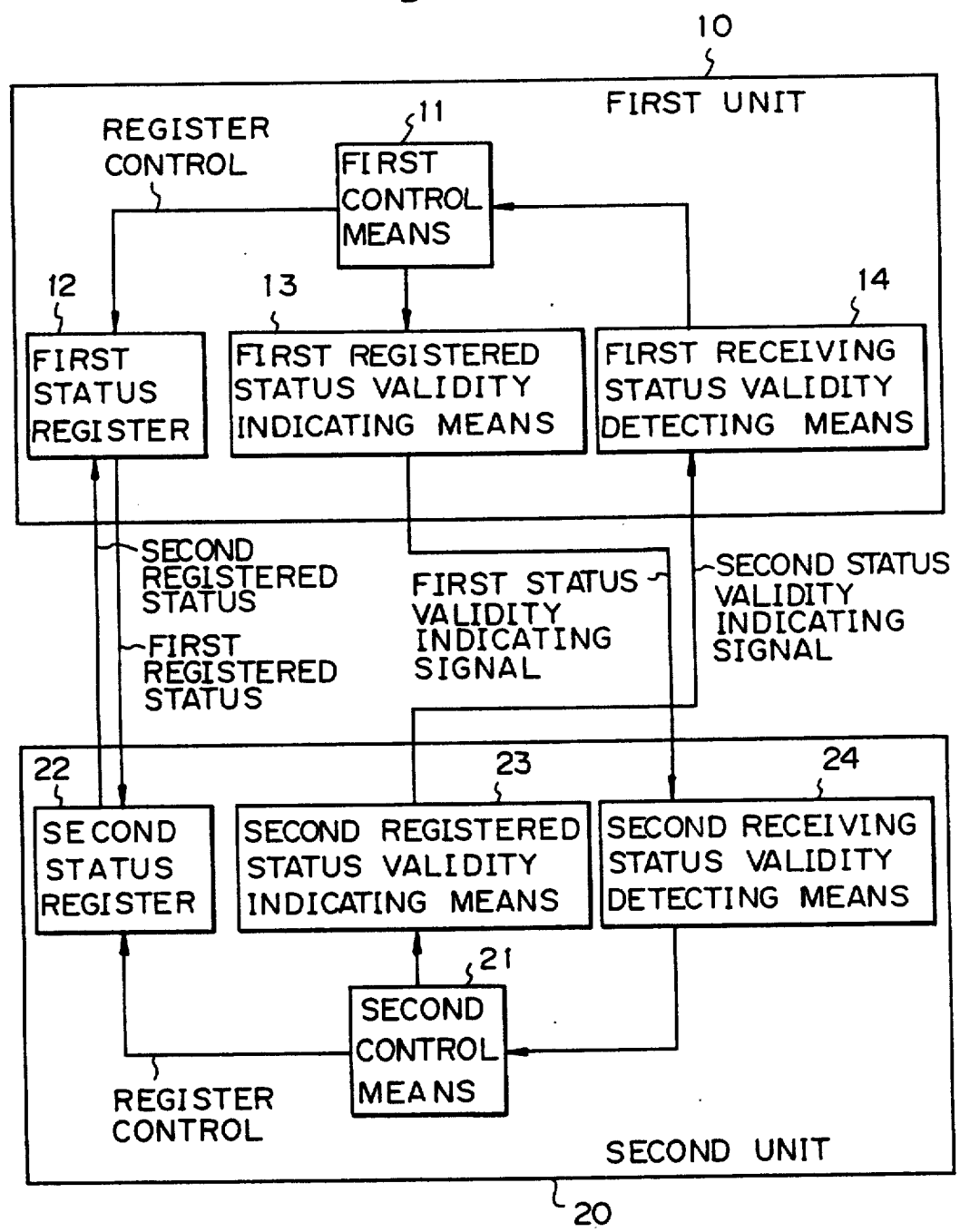
FIG. 2 shows the basic construction of the initial status setting system according to the present invention.

FIG. 2 shows a basic construction of the initial status setting system according to the present invention.

As mentioned before, the present invention is an initial status setting system applied to a multi-unit system constructed of a plurality of units, wherein at least one set of status data is held in at least two of said plurality of units. In FIG. 2, reference numerals 10 and 20 denote the above-mentioned two of said plurality of units, as a first unit 10 and a second unit 20. According to the present invention, a first status register 12, a first registered status validity indicating means 13, a first receiving status validity detecting means 14, and a first control means 11 are provided for the first unit 10, and a second status register 22, a second registered status validity indicating means 23, a second receiving status validity detecting means 24, and a second control means 21 are provided for the second unit 20.

The above set of status data held, in common, in at least two of said plurality of units is held in the above first status register 12 and the above second status register 22.

The above set of status data held in the first status register 12 is output to the second unit 20, and the above set of status data held in the second status register 22 is output to the first unit 10, as indicated by corresponding arrows.

Each of the first and second registered status validity indicating means 13, 23 indicates to the other of the respective first and second units 10 and 20, whether or not the set of status data held in the corresponding one of the status registers 12, 22 is valid.

The first receiving status validity detecting means 14 for the first unit 10 detects whether or not the set of status data held in the second status register 22 for the second unit 20 is valid, and the second receiving status validity detecting means 24 for the second unit 20 detects whether or not the set of status data held in the first status register 12 for the first unit 10 is valid.

The first control means 11 for the first unit 10 enables the set of status data received from the second unit 20 to be written into the first status register 12 for the unit 10, only when the set of status data received from the second unit 20 is detected as valid data.

The second control means 21 for the second unit 20 enables the set of status data received from the first unit 10 to be written into the second status register 22 for the unit 20, only when the set of status data received from the first unit 10 is detected as valid data.

According to the above construction of the present invention, the first control means 11 for the first unit 10 recognizes whether or not the set of status data received from the second unit 20 is valid by an output of the first receiving status validity indicating means 14, and the second control means 21 for the second unit 20 recognizes whether or not the set of status data received from the first unit 10 is valid by an output of the second receiving status validity indicating means 24. Therefore, each of the first control means 11 and the second control means 21 makes the corresponding status register 12 or 22 writable or not writable in accordance with the output of the corresponding one of the first and second receiving status validity indicating means 14, 24.

Thus, according to the above construction of the present invention shown in FIG. 2, in each of the first and second units 10, 20, i.e., in each of the first and second status registers 12, 22, only the valid set of the status data can be set. In particular, when one of the first and second units 10, 20 is replaced with a new unit, a new construction as shown in FIG. 2 is constructed just after the replaced unit is installed in the multi-unit system, i.e., just after the replaced unit is connected to the other unit, and therefore, an automatical setting of the valid set of status data becomes possible.

It is possible to add other functions to the abovementioned function of the first and second controlling portions 11, 21 in the construction of FIG. 2, as follows.

A first type of additional function to which may be added to the first control means 11 enables the set of status data received from the second unit 20 to be written into the first status register 12, only when the set of status data held in the first status register 12 is detected as invalid; similarly, the first type of additional function to be added to the second control means 21 enables the set of status data received from the first unit 10 to be written into the second status register 22, only when the set of status data held in the second status register 12 is detected as invalid data.

If the above construction of the present invention shown in FIG. 2, in which each of the first and second control means 11, 21 has the abovementioned first type of additional function, is applied to the multi-unit system which is constructed by a plurality of units, it is possible to prevent the writing of a wrong set of data into each of the plurality of units, or to eliminate unnecessary operations for writing a valid set of status data into the unit in which the set of valid set of data is already set.

A second type of additional function which may be added to each the first and second control means 11, 21, is as follows. One of the first and second control means 11, 21, e.g., the second control means 21, can be given the function of making the indication of the second registered status validity indicating means 23 invalid when initializing the second unit 20, and the other of the first and second control means 11, 21, e.g., the first control means 11, after first initializing the first unit 10, can be given a function of confirming whether or not the set of status data held in the second status register 22 is valid, and then enabling the writing the set of status data received from the second unit 20 in the first status register 12 when the set of status data held in the second status register 22 is valid.

If the construction of the present invention shown in FIG. 2, in which each of the first and second control means 11, 21 has the abovementioned first and second types of additional functions, is applied to the multi-unit system constructed by a plurality of units, it is possible to give each of the first and second units 10, 20, both of which should hold a common set of status data in the status register in each of the units, a priority order of validity of the set of status data held in each of the units.

For example, when both of the first and second units 10, 20 are replaced with corresponding new units, or at the time of power-ON of the entire multi-unit system, both of the replaced first and second units 10, 20 are intialized. At the same time, the indication of the second registered status validity indicating means 23 is made invalid, and the first control means 11, after first initializing the first unit 10, proceeds to confirm whether or not the set of status data held in the second status register 22 is valid and accordingly recognizes that the set of status data held in the second status register 22 is not valid. Therefore, in this case, writing of the set of status data received from the second unit 20 in the first status register 12 is not carried out, and only the writing of the set of status data received from the first unit 10 into the second status register 22 of the second unit 20 is carried out, i.e., the set of status data held in the first unit 10 is given a validity priority due to the abovementioned first and second types of additional functions.

In connection with the above-mentioned second type of additional function which may be added to each of the first and second control means 11, 21, the confirmation by the first control means 11 is accomplished, for example, by the following process.

As a first step of the process of the realization of a confirmation function in the second type of additional function, the first control means 11 sends the indication of the first registered status validity indicating means 13 to the second unit 20 and, as a second step, the first control means 11 waits for the output of the second registered status validity indicating means 23.

On the other hand, the second control means 21, as a third step of the process of accomplishing the confirmation function in the second type of additional function, waits for the output of the first registered status validity indicating means 13 after the initialization of the second unit 20. As a fourth step, responding to a received indication of the first registered status validity indicating means 13, the second control means 21 sends the output of the second registered status validity indicating means 23 to the first unit 10 if the output of the first registered status validity indicating means 13 shows that the data is invalid.

By the abovementioned process, when the first unit 10 only is replaced, generally, the set of status data held in the first unit 10 is invalid, and the set of status data held in the second unit 20 is valid. Therefore, first, information that the set of status data held in the first unit 10 is invalid is sent from the first unit 10 to the second unit 20, the second control means 21 receives the information, recognizes that the output of the first registered status validity indicating means 13 indicates that the data is invalid, and then sends the output of the second registered status validity indicating means 23, which indicates that the set of status data held in the second unit 20 is valid, to the first unit 10, and thus, the set of status data held in the second unit 20 is then written into the first status register 12.

By the aforementioned process, when both of the first and second units 10, 20 are replaced, by the aforementioned first type of additional function, the set of status data held in the second unit 20 is made invalid at the time of initialization. In this condition, and as a first step the output of the first registered status validity indicating means 13 is sent from the first unit 10 to the second unit 20. The second control means 21 receives the information, and recognizes whether or not the output of the first registered status validity indicating means 13 indicates that the data is valid. If the output of the first registered status validity indicating means 13 indicates invalid data, the second control means 21 sends the output of the second registered status validity indicating means 23, which indicates that the set of status data held in the second unit 20 is invalid, to the first unit 10. Conversely, if the output of the first registered status validity indicating means 13 indicates that the data is valid, it is not necessary for the first unit 10 to be informed of the output of the second registered status validity indicating means 23. In this case, the set of status data held in the first unit 10 is written into the second status register 22.

A third type of additional function of each of the first and second control means 11, 21, which is added to the aforementioned first and second additional functions, is as follows. The other aforementioned one of the first and second control means 11, 21, i.e., the first control means 11, is given the function of making the indication of the first registered status validity indicating means 13 valid after the aforementioned confirmation, and the second control means 21 is given the function of making the indication of the second registered status validity indicating means 23 valid after writing the set of status data, sent from the first status register 11, into the second status register 21.

By the abovementioned third type of additional function, when the process of setting the status data at the time of initialization is completed, the information that both the set of data held in the first status registers 12 and the set of data held in the second status registers 12, 22 are valid, and that a further setting operation is not necessary, is held in both of the first and second registered status validity indicating means 13, 23.

Figure 3:
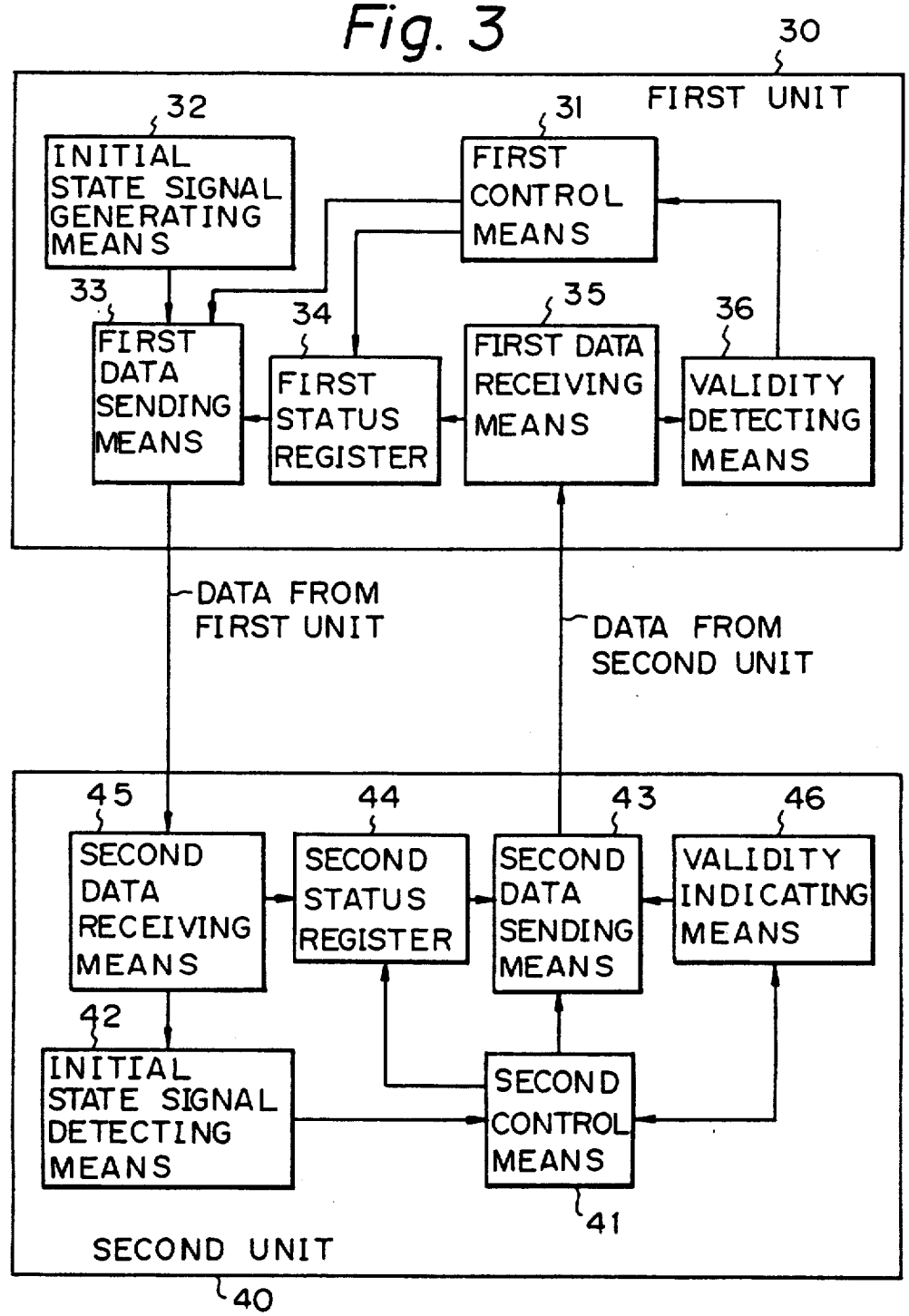
FIG. 3 shows the outline of the construction of an embodiment of the initial status setting system according to the present invention.

FIG. 3 shows a outline of the construction of an embodiment of the initial status setting system according to the present invention, which performs the aforementioned functions of the construction of FIG. 2. The construction of FIG. 3 is an initial status setting system in a multi-unit system constructed of a plurality of units 30, 40 wherein at least a set of status data is held in at least two of the plurality of units 30, 40, i.e., a first unit 30 and a second unit 40.

In FIG. 3, reference numeral 30 is a first unit which corresponds to the first unit 10, and reference numeral 40 is a second unit which corresponds to the second unit 20 in FIG. 2.

Reference numeral 31 is a first control means, 32 is an initial state signal generating means, 33 is a first data sending means, 34 is a first status register, 35 is a first data receiving means, and 36 is a validity detecting means. The first status register 34 corresponds to the first status register 12, and the validity detecting means 36 corresponds to the first validity detecting means 13 in FIG. 2.

Reference numeral 41 is a second control means, 42 is an initial state signal detecting means, 43 is a second data sending means, 44 is a second status register, 45 is a second data receiving means, and 46 is a validity detecting means. The second status register 44 corresponds to the second status register 22, and the validity detecting means 46 corresponds to the second validity detecting means 24 in FIG. 2.

The first control means 31, the initial state signal generating means 32, the first data sending means 33, the first status register 34, the first data receiving means 35, and the validity detecting means 36 are provided for the first unit 30, and the second control means 41, the initial state signal detecting means 42, the second data sending means 43, the second status register 44, the second data receiving means 45, and the validity indicating means 46 are provided for the second unit 40.

Each of the first and second status registers 34, 44 holds a respective set of status data.

The initial state signal generating means 32 generates an initial state signal which indicates that the first unit 30 is in the initial state.

The first data sending means 33 sends the initial state signal for the generating means 32 or the set of status data held in the first status register 34 to the second unit 40, under the control of the first control means 31.

The second data receiving means 45 of the second unit 40 receives the initial state signal from the generating means 32 or the set of status data held in the first status register 34 of the first unit 30. The initial state signal detecting means 42 detects the initial state signal in the output of the second data receiving means 45. The validity indicating means 46 indicates whether or not the set of status data held in the second status register 44 is valid.

The second data sending means 43 of the second unit 32 sends each of the validity indication output signal of the validity indicating means 46 and the set of status data held in the second status register 44 to the first unit 30 under the control of the second control means 41. The first data receiving means 35 of the first unit 30 receives the validity indication output signal of the validity indicting means 46 and the set of status date held in the second status register 44 from the second unit 40. The validity detecting means 36 of the first unit 30 then detects whether or not the indication output signal of the validity indicating means 46 indicates that the data is valid.

The second control means 41 sets the validity indicating means 46 to invalid when initializing the second unit 40.

The first control means 31 controls the first data sending means 33 to send the initial state signal to the second unit 40 after initializing the first unit 30.

Further, the second control means 41 controls the second data sending means 43 to send the validity indication output signal of the validity indicating means 46 and the set of status data held in the second status register 44 to the first unit 30, when the initial state signal detecting means 42 detects receipt of the initial state signal from the first unit 30, and the second control means 41 writes the set of status data as sent from the first unit 30 and received in the second data receiving means 45 of the second unit 40, into the second status register 44, controls the second data sending means 43 to send the set of status data held in the second status register 44, and then sets the indication of the validity indicating means 46 to valid, when the initial state signal detecting means 42 determines that the output of the second data receiving means 45 does not include the initial state signal.

Further, the first control means 31 writes the set of status data sent from the second unit 40 and received in the first data receiving means 35 in the first status register 34, and then controls the first data sending means 33 to send the set of status data held in the first status register 34 to the second unit 40, into, when the validity detecting means 36 of the first unit 30 determines that the set of status data held in the second status register 44 of the second unit 40 is valid, in accordance with the output of the first data receiving means 35, and the first control means 31 controls the first data sending means 33 to send the set of status data held in the first status register 34, when the validity detecting means 36 determines that the set of status data held in the second status register 44 is invalid, in accordance with the output of the first data receiving means 35.

The operation of the construction of FIG. 3 is explained in the following as an explanation of the construction of a multiplexing equipment to which the initial status setting system of FIG. 3 is applied.

Figure 4:
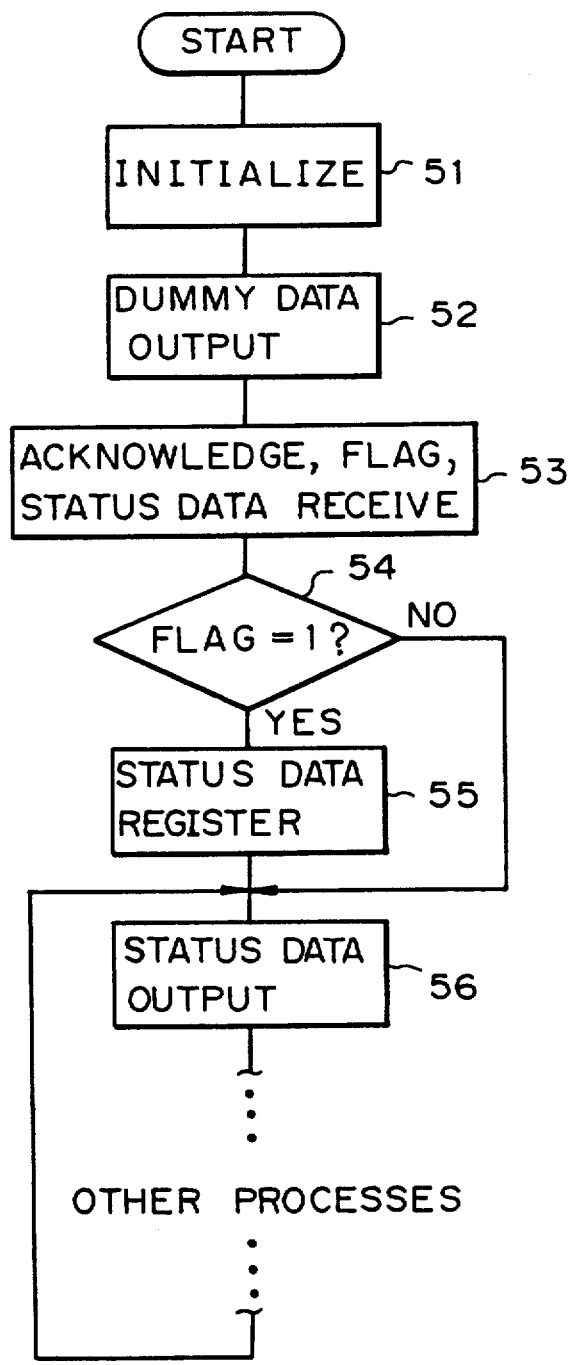
FIG. 4 shows a process executed in the microcomputer unit 101 in the control unit 100 in the construction of FIG. 7.
Figure 5:
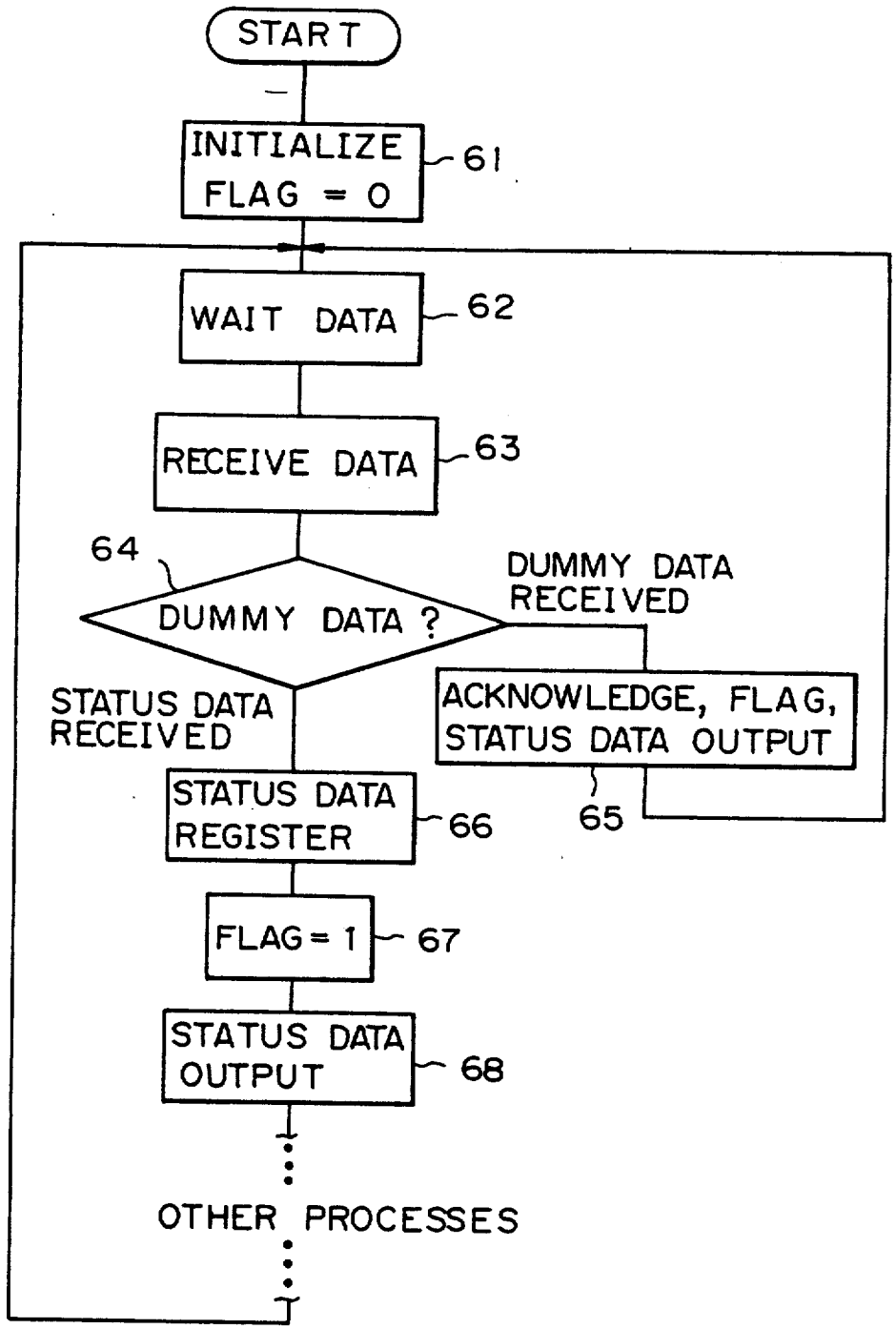
FIG. 5 shows a process executed in the microcomputer unit 201 in the multiplexing unit 200 in the construction of FIG. 7.
Figure 6A:
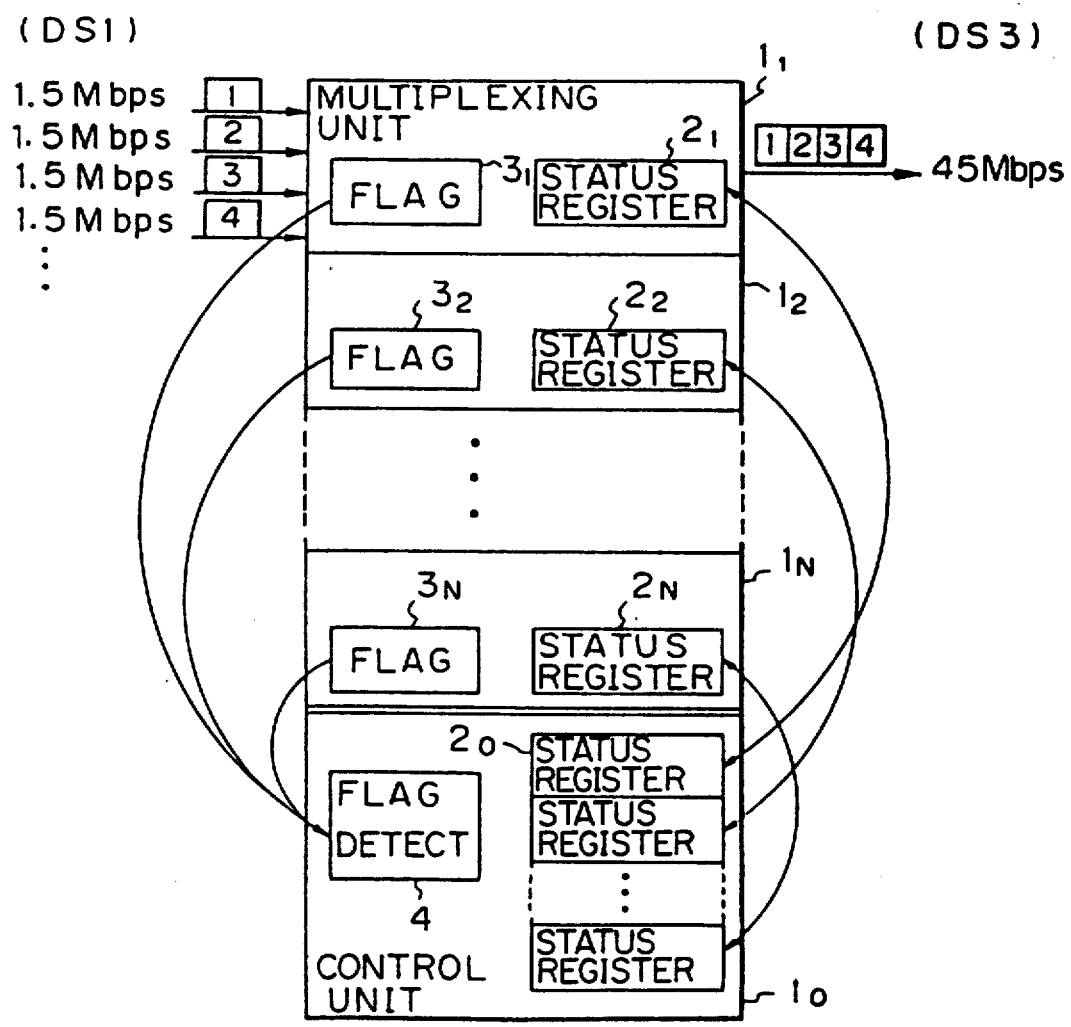
FIGS. 6A and 6B show the outline of the construction of an initial status setting system applied to a multiplexing equipment constituted of a plurality of units, comprising an embodiment of the present invention.
Figure 6B:
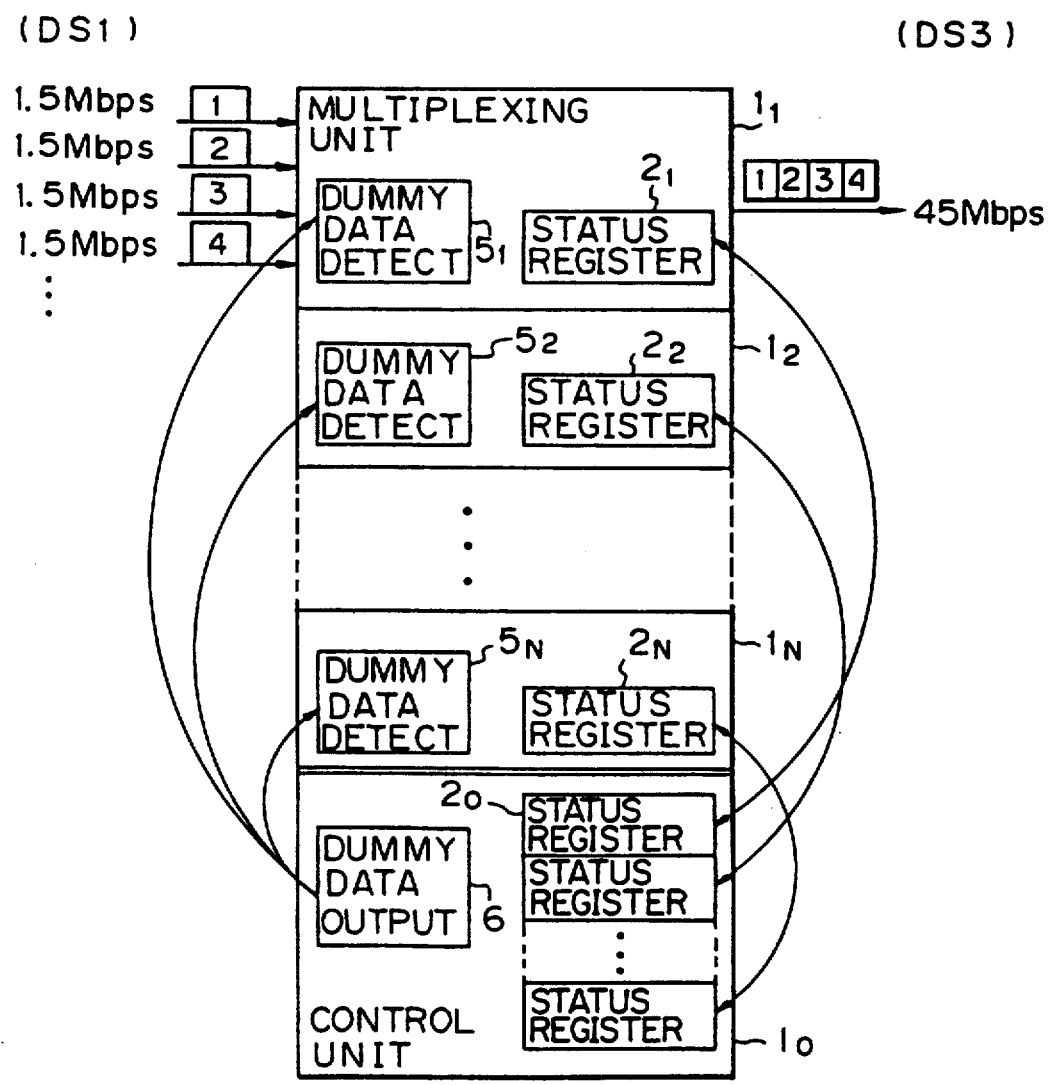

The process of operation in the multiplexing equipment to which the initial status setting system having the construction of FIG. 3 is applied, is shown in FIGS. 4 and 5, and an outlined configuration of status registers, flag registers, and other main components of the initial status setting system in the multiplexing equipment in shown by FIGS. 6A and 6B.

The construction of FIGS. 6A and 6B corresponds to the aforementioned construction of the conventional multiplexing equipment, i.e., each of reference numerals $1_1 \sim 1_n$ is a multiplexing unit, $1_0$ is a control unit, each of $2_1 \sim 2_n$ is a status register, $2_0$ is a group of status registers, each of which registers should hold the same set of status data as held by the corresponding one of the status registers $2_1 \sim 2_n$.

The control unit $1_0$ corresponds to the first unit 30, each of the multiplexing units $1_1 \sim 1_n$ corresponds to the second unit 40, the status register $2_0$ corresponds to the first status register 34, and each of the status registers $2_1 \sim 2_n$ corresponds to the second status register 44 in FIG. 3.

Each of reference numerals $3_1 \sim 3_n$ denotes a flag register, each of which corresponds to the validity detecting means 46, and 4 is a flag detecting means corresponding to the validity detecting means 36 in FIG. 3.

In the construction shown by FIGS. 6A and 6B, dummy data is used as the initial state signal in FIG. 3, and therefore, a dummy data outputting means 6 is provided corresponding to the initial stage signal generating means 32, and corresponding dummy data detecting means $5_1 \sim 5_n$ are provided in the respective multiplexing units $2_1 \sim 2_n$, each thereof corresponding to the initial stage signal detecting means 42.

Figure 7:
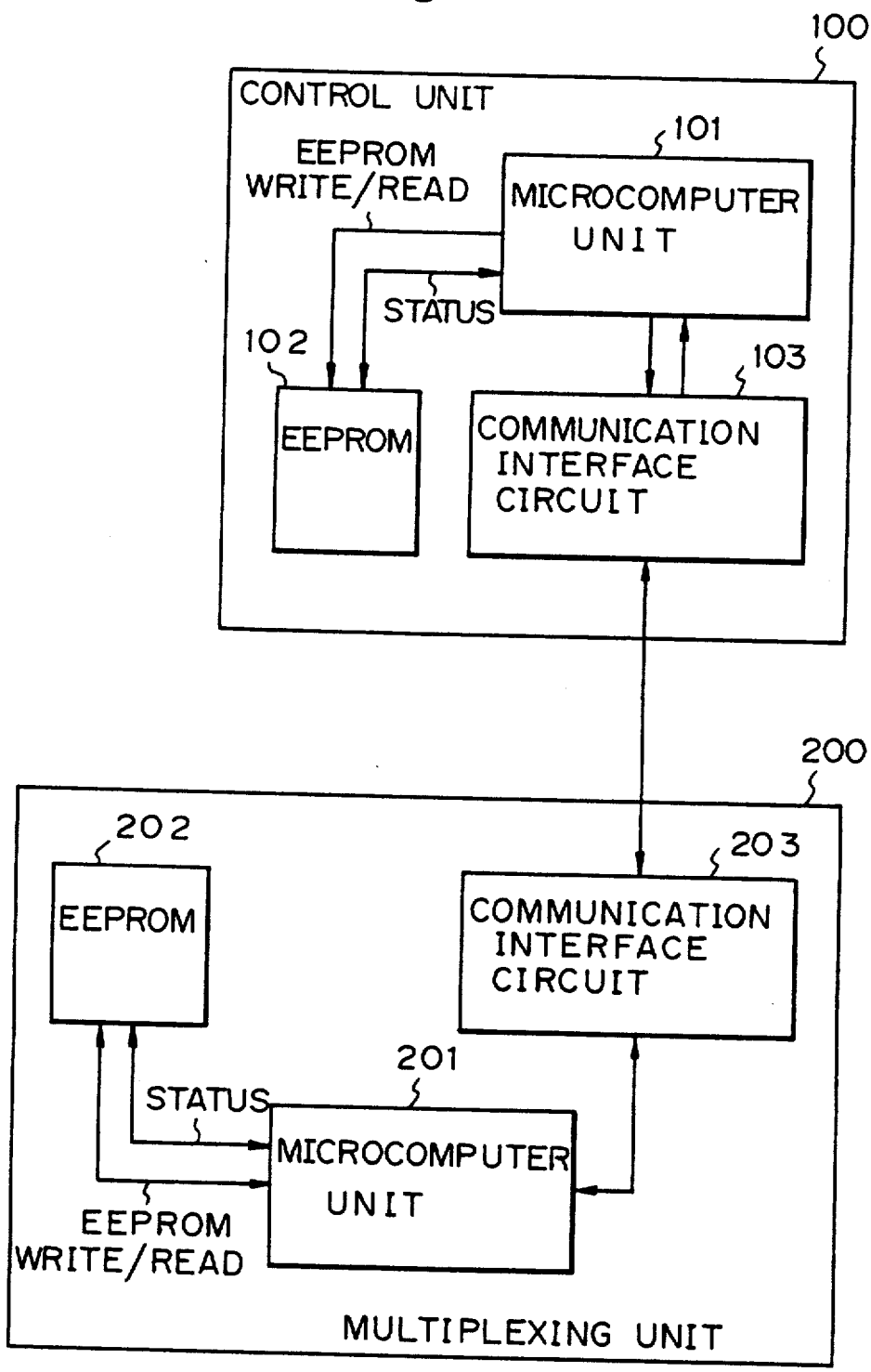
FIG. 7 shows the hardware construction of an embodiment of the multiplexing equipment according to the present invention.

The construction shown by FIGS. 6A and 6B is, in practice, realized by the hardware construction as shown in FIG. 7. In FIG. 7, reference numeral 100 is a control unit corresponding to the control unit $1_0$, and reference numeral 100 is a multiplexing unit corresponding to each of the umltiplexing units $2_1 \sim 2_n$ in FIGS. 6A and 6B. Further, in FIG. 7, each of reference numerals 101 and 201 is a microcomputer unit, each of 102 and 202 is an EEPROM corresponding to the status registers $2_0, 2_1 \sim 2_n$ in FIGS. 6A and 6B, and each of 103 and 203 is a communication interface circuit.

As mentioned later, each of the dummy data outputting means 6 in FIG. 6B (i.e., the initial stage signal generating means 32 in FIG. 3), the dummy data detecting means $5_1 \sim 5_n$ in FIG. 6B (i.e., the initial stage signal detecting means 42 in FIG. 3), the flag register $3_1 \sim 3_n$ in FIG. 6A (i.e., validity indicating means 46 in FIG. 3), the flag detecting means in FIG. 6A (i.e., the validity detecting means 36 in FIG. 3), and the first and second control means 31 and 41 in FIG. 3 are afforded in the respectively corresponding microcomputer units 101 and 201. Each of the microcomputer units 101 and 201 is a typical microcomputer unit consisting of a general purpose microprocessor (for example, 8085 type), a RAM, a ROM, and necessary peripheral interface circuits.

The first data sending means 33 and the first data receiving means 35 in FIG. 3 are implemented by the communication interface circuits 103 in FIG. 7, and the second data sending means 43 and the second data receiving means 45 in FIG. 3 are implemented by the communication interface circuits 203 in FIG. 7.

Each of the communication interface circuits 103 and 203 is a standard communication interface circuit, commercially available (for example, the programable communication interface circuit type M5L8251AP, manufactured by Mitsubishi Electric. Co.).

Figure 8:
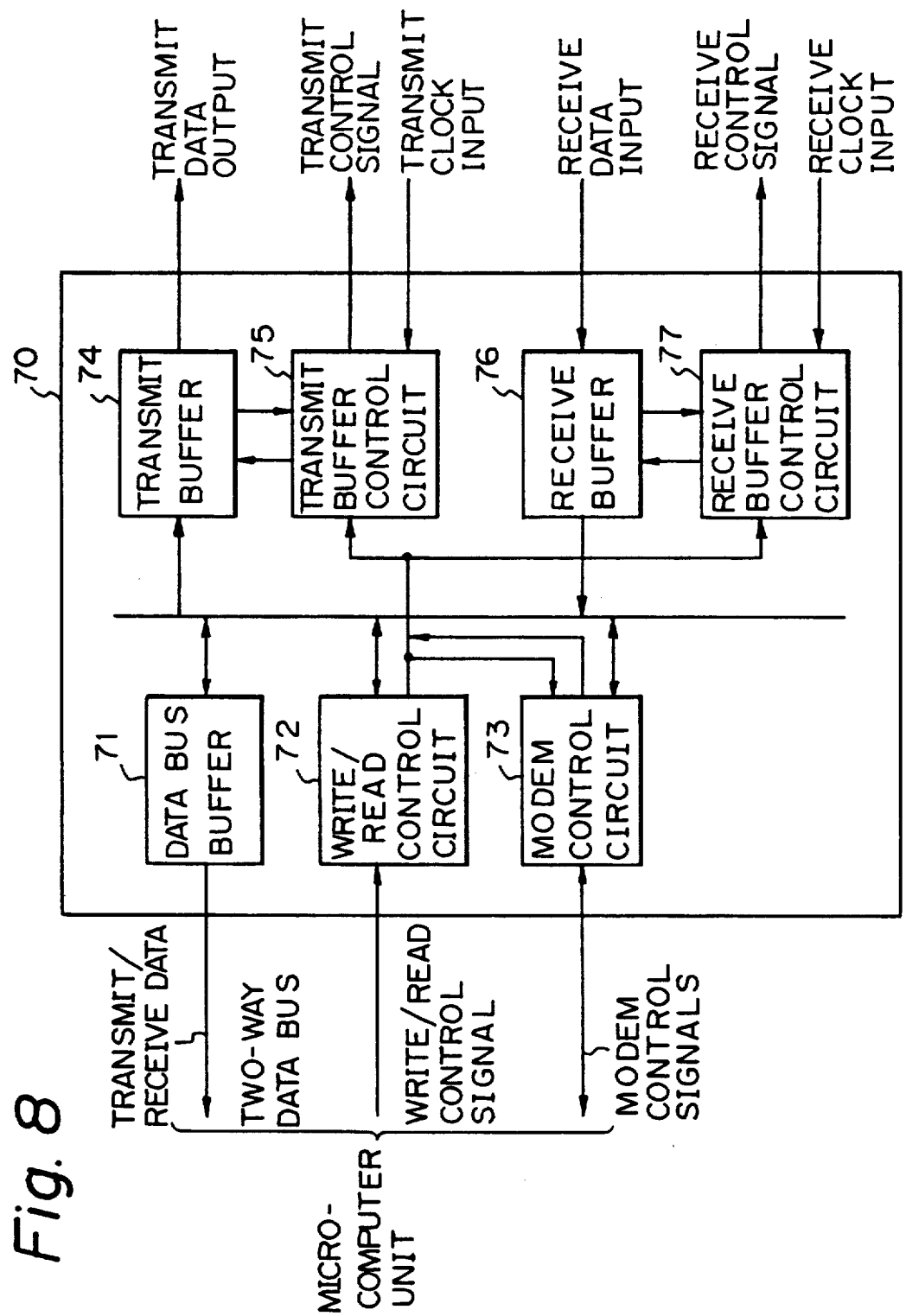
FIG. 8 shows an example of the construction of the communication interface circuit 203 in the embodiment of FIG. 7.

The detailed construction of the communication interface circuit 103 or 203 in FIG. 7 is shown in FIG. 8, under reference numeral 70. in FIG. 8, reference numeral 71 is a data bus buffer, 72 is a write/read control circuit, 73 is a MODEM control circuit, 74 is a transmit buffer, 75 is a transmit buffer control circuit, 76 is a receive buffer, and 77 is a receive buffer control circuit.

When sending data, a set of data prepared in the microprocessor in the microcomputer unit 101 or 201 is input in parallel through a data bus (not shown) to the data bus buffer 71 from the microprocessor, and transferred to the transmit buffer 74. In the transmit buffer 74, a start bit, a stop bit, a parity bit, etc., are added to the set of data, transformed to serial form, and serially output ("TRANSMIT DATA OUTPUT") to the other unit.

When receiving data from the other unit (e.g., "RECEIVE DATA INPUT"), a set of data of a predetermined data format from the other unit is serially input to the receive buffer 77. In the receive buffer 77, the start bit and the stop bit are detected and removed, transformed to a parallel form thereat, and transferred to the data bus buffer 71. The set of data is further transferred therefrom to the microprocessor in the microcomputer unit 101 or 201.

The transmit buffer control circuit 75 controls the parallel data input operation, the serial data output operation, and the parallel-to-serial transforming operation, in the transmit buffer 74 in accordance with MODEM control signals, internal write control signals supplied from the microprocessor in the microcomputer unit 101 or 201 through the MODEM control circuit 73, and a transmit clock ("TRANSMIT CLOCK INPUT").

The receive buffer control circuit 77 controls the serial data input operation, the parallel data output operation, and the serial to parallel transforming operation, in the receive buffer 76 in accordance with MODEM control signals, and internal read control signals supplied from the microporcessor in the microcomputer unit 101 or 201 through the MODEM control circuit 73, and a receive clock.

The write/read control circuit 72 receives control signals ("WRITE/READ CONTROL SIGNALS") to control writing operations in the transmit buffer 74 and reading operations in the receive buffer 76 from the microprocessor, and outputs the corresponding internal control signals to the transmit buffer 74 and the receive buffer 76.

The MODEM control circuit 73 is provided as an interface circuit for communication control signals ("MODEM CONTROL SIGNALS") between the corresponding microprocessor in the microcomputer unit 101 or 201 and the respective, other unit (through the transmit buffer control circuit 75 or receive buffer control circuit 77).

The EEPROM 102 corresponds to the status register $2_0$, and the EEPROM 202 corresponds to each of the status registers $2_1 \sim 2_n$ in each of FIGS. 6A and 6B.

For each of the flag registers $3_1 \sim 3_n$ (FIG. 6A), a predetermined address in the aforementioned RAM (not shown) or a register in the microcomputer unit in the corresponding multiplexing unit $1_1 \sim 1_n$ is used.

The dummy data is sent by using a predetermined bit in the data format used in a communication from the control unit $1_0$ to all of the multiplexing units $1_1 \sim 1_n$.

Figure 9:
FIG. 9 shows a format of the data transmitted from the control unit 100 to the multiplexing unit 200 in the embodiment of FIG. 7.
Figure 10:
FIG. 10 shows the data format when dummy data is transmitted from the control unit 100 to the multiplexing unit 200 in the embodiment of FIG. 7.

FIGS. 9 and 10 show a data format used when sending information form the control unit $1_0$ to all of the multiplexing units $1_1 \sim 1_n$. If FIGS. 9 and 10, "STX" is a start code, "ADDRESS" is an address signal, "ACK" is an acknowledge signal, "ETX" is a stop code, "BCC" is a bit check code, and "DMFG" is a dummy flag, e.g., the abovementioned bit indicating that the data sent is dummy date. "STATUS DATA" is the aforementioned set of status data sent from the control unit $1_0$ to each of the multiplexing units $1_1 \sim 1_n$. The set of status data sent to each of the multiplexing units $1_1 \sim 1_n$ if output from the control unit $1_0$ with an address signal which informs the multiplexing unit where the set of status data is to be received (not shown).

In the data format shown in FIG. 9, the dummy flag "DMFG" is set as "0", and the dummy flag "0" is followed by a series of effective bits constituting a set of status data (and maybe other data). Namely, this data format is used when sending the acknowledge signal and the effective status data.

On the other hand, in the data format shown in FIG. 10, the dummy flag "DMFG" is set as "1", and the dummy flag "1" is followed by a stop code with no effective bits constituting a set of status data (or the other data). Namely, this data format is used when sending dummy data only.

Figure 11:
FIG. 11 shows a format of the data transmitted from the multiplexing unit 200 to the control unit 100 in the embodiment of FIG. 7.

FIG. 11 shows a data format used when sending information from each of the multiplexing units $1_1 \sim 1_n$ to the control unit $1_0$. The "STX", "ADDRESS ", "ACK", "ETX", and "BCC" shown in FIG. 11 are the same as in FIGS. 9 and 10. The "STATUS DATA" in FIG. 11 is the aforementioned status data sent from each of the multiplexing units $1_1 \sim 1_n$ to the control unit $1_0$. This status data is output from each of the multiplexing units $1_1 \sim 1_n$ to the control unit $1_0$ with an address signal which informs the multiplexing unit from where the set of status data is dispatched (not shown). "FLG" in the data format of FIG. 11 shows the state of the flag register $3_i$ in the multiplexing unit $1_i$, from where the data format is dispatched.

The functions of preparing and outputting the data format of FIGS. 9 and 10 are performed by the microcomputer unit 101 and the communication interface circuit 103 in the control unit $1_0$, and the function of preparing and outputting the data format of FIG. 11 are performed by the microcomputer unit 201 and the communication interface circuit 203 provided in each of the multiplexing units $1_1 \sim 1_n$.

When each of the multiplexing units $1_1 \sim 1_n$ receives a format of data from the control unit $1_0$, the microcomputer unit in the multiplexing unit looks up the predetermined bit for the dummy flag "DMFG" in accordance with a program of the microcomputer unit in each of the multiplexing units $1_1 \sim 1_n$, and determines whether or not the data sent from the control unit $1_0$ is dummy data. This operation accomplishes the function of the dummy data detecting means $5_1 \sim 5_n$ in FIG. 6B.

When the control unit $1_0$ receives a format of data from each of the multiplexing units $1_1 \sim 1_n$, the microcomputer unit in the control unit $1_0$ looks up the predetermined bit for the flag bit "FLG" in accordance with a program of the microcomputer unit 103 in the control unit $1_0$, and determines whether or not the data sent from each of the multiplexing units $1_1 \sim 1_n$ is valid, i.e., whether or not the set of statas data held in each of the multiplexing units $1_1 \sim 1_n$ is valid. This operation accomplishes the function of the flag detecting means 4 in FIG. 6A.

In FIGS. 6A and 6B, the flow of the status data transferred between the control unit $1_0$ and each of the multiplexing units $1_1 \sim 1_n$, the flow of the information of the states of the flag registers $3_1 \sim 3_n$ in the multiplexing units $1_1 \sim 1_n$ to the control unit $1_0$, and the flows of the dummy data from the control unit $1_0$ to each of the multiplexing units $1_1 \sim 1_n$, are shown by arrows.

FIG. 4 shows a control process relating to the initial status setting system according to the present invention in the microcomputer unit 101 in the control unit $1_0$, and FIG. 5 shows a control process relating to the initial status setting system according to the present invention in the microcomputer unit 201 in each of the multiplexing units $1_1 \sim 1_n$ of FIGS. 6A and 6B.

In the following, the operation of the initial status setting setting system according to the present invention having a construction shown in FIGS. 3, 6A, 6B, and 7, is explained with reference to FIGS. 4 and 5.

First, at the time of power-ON of the whole system of the multiplexing equipment of FIGS. 6A and 6B, the control unit $1_0$ first carries out the initialization routine in step 51 of FIG. 4, and each of the multiplexing units $1_1 \sim 1_n$ carries out the initialization routine in step 61 of FIG. 5. At this time, in each of the multiplexing units $1_1 \sim 1_n$, the state of each of the flag registers $3_1 \sim 3_n$ is made "0", i.e., "invalid".

Next, the program of the each of the multiplexing units $1_1 \sim 1_n$ proceeds to step 62, and waits to receive data sent from the control unit $1_0$.

On the other hand, the control unit $1_0$ outputs dummy data to each of the multiplexing units $1_1 \sim 1_n$ in step 52.

Each of the multiplexing units $1_1 \sim 1_n$ receives the dummy data sent from the control unit $1_0$ in step 63, and in step 64, determines whether or not the received data is dummy data, and then in step 65, based on the recognition that the received data is dummy data, an acknowledge signal "ACK", the state of each of the flag registers $3_1 \sim 3_N$ in each multiplexing unit $1_1 \sim 1_N$, and the set of status data held in each of the multiplexing units $1_1 \sim 1_N$, i.e., the content of each of the status registers $2_1 \sim 2_N$, is set to the control unit $1_0$ using the data format shown in FIG. 11. After sending these signals and data, the program of each of the multiplexing units $1_1 \sim 1_N$ returns to step 62 to wait for the next data from the control unit $1_0$.

The control unit $1_0$ receives the acknowledge signal "ACK", the states of all the flag registers $3_1 \sim 3_N$ in all the multiplexing units $1_1 \sim 1_N$, and all the sets of status data held in all the multiplexing unit $1_1 \sim 1_N$, i.e., the entire content of the status registers $2_1 \sim 2_N$ sent from all of the multiplexing units $1_1 \sim 1_N$ in step 53, and determines in step 54 whether or not the received information of the state of each of the flag registers $3_1 \sim 3_N$ is "1" (valid). As the state of all the flag registers $3_1 \sim 3_N$ is not "1" (valid) in this case, the program of the control unit $1_0$ jumps to step 56 to output the sets of status data (corresponding to all of the sets of status data held in all the multiplexing units $1_1 \sim 1_N$) already held in the status register $2_0$. Thereafter, the program of the control unit $1_0$ continues the execution of the other processes and repeatedly outputs all the sets of status data as mentioned above and held in the status register $2_0$.

Corresponding to the output of all of the sets of status data held in the status register $2_0$ in the control unit $1_0$ in step 56, each of the multiplexing units $1_1 \sim 1_N$, which has been waiting in step 62, receives the corresponding set of status data sent from the control unit $1_0$ in step 63, and recognizes that the received data is not dummy data in step 64. Therefore, each of the multiplexing units $1_1 \sim 1_N$ writes the received set of status data sent from the control unit $1_0$ into the corresponding one of the status registers $2_1 \sim 2_N$ in step 66, and sets "1" in each of the flag registers $3_1 \sim 3_N$ in step 67.

After these operations, each of the multiplexing units $1_1 \sim 1_N$ then outputs the corresponding set of status data held in each of the status registers $2_1 \sim 2_N$ in step 68. After the completion of the above steps, each of the multiplexing units $1_1 \sim 1_N$ starts the execution of the other processes, and when the execution of the other processes is completed, returns to step 62 to wait for the next receipt data.

Next, when one of the multiplexing units $1_1 \sim 1_N$ is replaced by a new unit $1_i$ (i = 1 ~ N), the replaced multiplexing unit $1_i$ is first initialized and the state of the corresponding flag register $3_i$ is set as "0" in step 61, and then the unit waits to receive the next data in step 62. As mentioned before, the control unit $1_0$ repeatedly outputs all of the sets of status data to all of the multiplexing units $1_1 \sim 1_N$; accordingly, the replaced multiplexing unit $1_i$ receives the corresponding set of status data sent from the control unit $1_0$ in step 63, and determines whether or not the received data is dummy data in step 64, and then, based on the recognition that the received data is not dummy data, the multiplexing units $1_i$ writes the received set of status data sent from the control unit $1_0$ in the status registers $2_i$ in step 66, sets "1" in the flag registers $3_i$ in step 67, and outputs the set of status data held in the status registers $2_i$ in step 68. After the completion of the above steps the multiplexing units $1_i$ starts the execution of the other processes, and when the execution of the other processes is completed, returns to step 62 to wait for the next receipt of data.

When the control unit $1_0$ is replaced, the control unit $1_0$ carries out the initialization routine in step 51 of FIG. 4. At this time, each of the multiplexing units $1_1 \sim 1_N$ is waiting to receive data sent from the control unit $1_0$ in step 62.

Next, the control unit $1_0$ outputs dummy data to each of the multiplexing units $1_1 \sim 1_N$ in step 52.

Each of the multiplexing units $1_1 \sim 1_N$ receives the dummy data sent from the control unit $1_0$ in step 63, and determines whether or not the received data is dummy data in step 64. After the determination, based on the recognition that the received data is dummy data, an acknowledge signal "ACK", information of the state of the corresponding one of the flag registers $3_1 \sim 3_N$ in each of the multiplexing units $1_1 \sim 1_N$, and each of the sets of status data held in each of the multiplexing units $1_1 \sim 1_N$, i.e., the contents of each of the status registers $2_1 \sim 2_N$, are sent to the control unit $1_0$ using the data format shown in FIG. 11, in step 65, and then each of the multiplexing units $1_1 \sim 1_N$ returns to step 62 to wait for the next data from the control unit $1_0$.

The control unit $1_0$ receives the acknowledge signals "ACK" from all of the multiplexing units $1_1 \sim 1_N$, the states of all the flag registers $3_1 \sim 3_N$ in all of the multiplexing unit $1_1 \sim 1_N$, and all of the sets of status data held in all the multiplexing units $1_1 \sim 1_N$, i.e., the content of the status registers $2_1 \sim 2_N$ sent from each of the multiplexing units $1_1 \sim 1_N$ in step 53, and determines whether or not the received information of the state of each of the flag registers $3_1 \sim 3_N$ is "1" (valid) in step 54.

In this case, the state of each of the flag registers $3_1 \sim 3_N$ is determined to be "1" (valid) because none of the multiplexing units $1_1 \sim 1_N$ has been replaced. Therefore, the control unit $1_0$ writes the received set of status data sent from all of the multiplexing units $1_1 \sim 1_N$ in the status register $2_0$ in the control unit $1_0$ in step 55, and then outputs the set of status data held in the status register $2_0$ in step 56. After the above steps, the control unit $1_0$ continues the execution of the other processes and repeatedly outputs the set of status data held in the status register $2_0$.

As readily understood from the above explanation of the process of initial status setting, all the functions of the first and second control meanss 11 and 21 explained before with regard to the construction of FIG. 2, are realized in the process of FIGS. 4 and 5.

We claim:

1. An initial status setting system for a multi-unit system having a plurality of units, comprising:
for each of at least first and second units of said plurality of units and respectively corresponding thereto:
a status register for holding at least a set of status data;
registered status validity indicating means for providing an indication output representing whether the set of status data held in the status register of the corresponding said unit is valid or invalid;
status validity receiving and detecting means for receiving the indication provided by the registered status validity indicating means of the other of said first and second units and detecting from the received indication whether the set of status data held in the associated status register of said other of said first and second units is valid or invalid and for producing corresponding valid and invalid detection outputs;
means for transferring the set of status data held by the status register thereof to the other of said first and second units and for transferring the indication output provided by the registered status validity indicating means thereof to the status validity receiving and detecting means of the other of said first and second units;
control means for enabling the writing into the corresponding status register thereof, the set of status data received from the other of said first and second units; and
said control means of one of said first and second units responding to a valid status data set detection output of the status validity receiving and detecting means of said one unit for enabling the writing of the set of status data received from the other of said first and second units into the status register of said one unit.

2. An initial status setting system according to claim 1, wherein:
each said control means further is responsive to the set of status data held in the status register of the respectively corresponding said unit being detected as invalid data, for enabling the writing into the status register of the respectively corresponding said unit, of the set of status data received from the other of said first and second units.

3. An initial status setting system according to claim 2, wherein:
   each said control means further is operative for initializing the respectively associated said unit;
   said control means of said second unit being operative, when initializing said second unit, for controlling said registered status validity indicating means of said second unit to provide an invalid indication output as to the set of status data held in the status register of said respective, second unit; and
   said control means of said first unit further is operative, after first initializing said respective, first unit, for confirming that said set of status data held in said status register of said second unit is valid, in accordance with a valid detection output of the respectively associated status validity receiving and detecting means of said first unit produced in response to receipt thereby of a valid indication output from said second unit, for enabling writing the set of status data received from said second unit into said status register of said respective, first unit.

4. An initial status setting system according to claim 3, wherein, to effect said validity confirmation by said control means of said first unit:
   said control means of said first unit controls said transfer means thereof to transfer the indication output of said registered status validity indicating means of said first unit to said second unit and, thereafter, for waiting for receipt of the indication output of said registered status validity indicating means of said second unit and, in response thereto, for enabling the writing of the set of status data received from said second unit into said status register of said respective, first unit; and
   said control means of said second unit further is operative, after initialization of the second unit thereby, for waiting for receipt of an invalid indication output of the registered status validity indicating means of said first unit and, in response thereto, for controlling the transfer means thereof to transfer the valid indication output of the registered status validity indicating means thereof to said first unit.

5. An initial status setting system according to claim 4, wherein:
   said first control means further is operative, after confirming the validity of the set of status data held in said second status register of said respective, second unit, for controlling said first registered status validity indicating means of said respective first unit to provide a valid indication output; and
   said second control means further is operative, after enabling the writing of said set of status data received from said status register of said respective first unit into said second status register of said respective second unit, for controlling said registered status validity indicating means of said respective second unit to provide a valid indication output.

6. An initial status setting system for a multi-unit system having a plurality of units, comprising:
   at least first and second units of said plurality of units respectively holding at least a set of status data;
   said first unit further comprising:
      first control means;
      initial state signal generating means;
      first data sending means;
      a first status register;
      first data receiving means; and
      validity detecting means; and
   said second unit further comprising:
      second control means;
      initial state signal detecting means;
      second data sending means;
      a second status register;
      second data receiving means; and
      validity indicating means;
   said first and second status registers respectively holding said sets of status data;
   said initial state signal generating means being operative for generating an initial state signal which designates that said first unit is in an initial state;
   said first data sending means being operative, under control of said first control means, for selectively sending said initial state signal and said set of status data held in said first status register to said second unit;
   said second data receiving means being operative for receiving said initial state signal or said set of status held in first data register, as sent to said second unit from said first unit, and producing respectively corresponding outputs;
   said initial state signal detecting means being operative for detecting said initial state signal as received by said second data receiving means in accordance with the corresponding output thereof;
   said validity indicating means being operative for producing an indication output, indicating whether or not said set of status data held in said second status register is valid;
   said second data sending means being operative, under control of said second control means, for sending each of the indication output of said validity indicating means and said set of status data held in said second status register to said first unit;
   said first data receiving means being operative for receiving said indication output of said validity indicating means and said set of status data held in said second status register, as sent thereto from said second unit, and for producing corresponding outputs;
   said validity detecting means being operative for detecting whether or not the indication output of the validity indicating means indicates that the corresponding set of status data is valid or invalid and for producing corresponding valid and invalid detection outputs;
   said second control means further being operative to initialize said second unit and for setting said validity indicating means to produce an invalid data output when initializing said second unit;
   said first control means further being operative for initializing said first unit and for controlling said first data sending means to send said initial state signal to said second unit following initialization of said first unit;
   said second control means further being operative in response to said initial state signal detecting means detecting said initial state signal, for controlling said second data sending means to send said indication output of said validity indicating means and said set of status data held in said second status register to said first unit;

said second control means being responsive to a detection output of said initial state signal detecting means indicating the determination thereof that the output of said second data receiving means does not include said initial state signal, for writing said set of status data sent from said first unit and received in said second data receiving means of said second unit into said second status register thereof, for controlling said second data sending means to send said set of status data held in said second status register to said first unit, and for controlling said validity indicating means of said second unit to produce a valid indication output; and said first control means further being responsive to:
a valid detection output of said validity detecting means, in accordance with the determination thereby that said set of status data held in said second status register is valid, responsive to receipt thereby of the output of said first data receiving means, for writing said set of status data sent from said second unit and received by said first data receiving means in said first status register of said first unit and controlling said first data sending means thereof to send said set of status data held in said first status register to said second unit; and an invalid detection output of said validity detecting means, in accordance with the determination thereby that said set of status data held in said second status register is invalid, responsive to receipt thereby of the output of said first data receiving means, for controlling said first data sending means to send said set of status data held in said first status register to said second unit.

* * * * *

UNITED STATES PATENT AND TRADEMARK OFFICE
CERTIFICATE OF CORRECTION

PATENT NO. : 4,989,130
DATED : January 29, 1991
INVENTOR(S) : Junichi MORIYAMA et al.

It is certified that error appears in the above-identified patent and that said Letters Patent is hereby corrected as shown below:

Col. 2, line 32, change "opration" to --operation--;
        line 33, "posibility" to --possibility--;
        line 67, "posibility" to --possibility--.

Col. 8, line 23, change "32" to --40--.

Col. 9, line 35, change "in" to --In--;
        line 48, change "umltiplexing" to --multiplexing--.

Col. 10, line 52, change "microporcessor" to --microprocessor--.

Col. 14, line 21, change "meanss" to --means--.

Col. 16, line 23, after "status" insert --data--.

Signed and Sealed this

Sixth Day of July, 1993

Attest:

MICHAEL K. KIRK

*Attesting Officer*     *Acting Commissioner of Patents and Trademarks*